United States Patent
Zhao et al.

(10) Patent No.: US 11,984,931 B2
(45) Date of Patent: May 14, 2024

(54) SYSTEM FOR GENERATING AND RECEIVING POLARIZATION MULTIPLEXED SINGLE SIDEBAND SIGNAL AND METHOD THEREFOR

(71) Applicant: Xi'an University of Posts & Telecommunications, Shaanxi (CN)

(72) Inventors: Feng Zhao, Shaanxi (CN); Yi Wei, Shaanxi (CN); Jingling Li, Shaanxi (CN); Jianjun Yu, Shaanxi (CN)

(73) Assignee: Xi'an University of Posts & Telecommunications, Shaanxi (CN)

( * ) Notice: Subject to any disclaimer, the term of this patent is extended or adjusted under 35 U.S.C. 154(b) by 157 days.

(21) Appl. No.: 17/634,951

(22) PCT Filed: Apr. 20, 2021

(86) PCT No.: PCT/CN2021/088342
§ 371 (c)(1),
(2) Date: Feb. 11, 2022

(87) PCT Pub. No.: WO2022/188241
PCT Pub. Date: Sep. 15, 2022

(65) Prior Publication Data
US 2023/0163855 A1 May 25, 2023

(30) Foreign Application Priority Data
Mar. 12, 2021 (CN) .......................... 202110270210.2

(51) Int. Cl.
*H04B 10/516* (2013.01)
*H04B 10/50* (2013.01)
*H04B 10/61* (2013.01)

(52) U.S. Cl.
CPC ......... *H04B 10/516* (2013.01); *H04B 10/503* (2013.01); *H04B 10/616* (2013.01)

(58) Field of Classification Search
CPC .................................................. H04B 10/516
See application file for complete search history.

(56) References Cited

U.S. PATENT DOCUMENTS

| | | | |
|---|---|---|---|
| 6,275,315 B1 * | 8/2001 | Park ................. | H04B 10/25133 385/124 |
| 2011/0069964 A1 * | 3/2011 | Yu ......................... | H04B 10/90 398/130 |
| 2019/0089479 A1 * | 3/2019 | Yamauchi ............ | H04B 10/532 |

FOREIGN PATENT DOCUMENTS

CN 112087248 A * 12/2020 ........... H04B 10/503

OTHER PUBLICATIONS

Zhu et al., "Direct detection of polarization multiplexed single sideband signals with orthogonal offset carriers", Optics Express vol. 26, No. 12, Jun. 2018 (Year: 2018).*

(Continued)

*Primary Examiner* — Shi K Li
(74) *Attorney, Agent, or Firm* — Berkeley Law & Technology Group, LLP

(57) ABSTRACT

A system for generating and receiving a polarization multiplexed single sideband signal is provided, which includes a light wave generating unit connected with a signal modulating unit and configured to generate a light wave; a driving signal generating unit connected with the signal modulating unit and configured to generate a driving signal; the signal modulating unit configured to split the light wave into two orthogonal polarized light waves, and modulate the driving signal on the polarized light waves to obtain a polarization multiplexed upper sideband optical signal and a polarization multiplexed lower sideband optical signal which are coupled to output a mixed signal, the mixed signal is transmitted to a separating and converting unit to obtain electrical millimeter wave signals; the electrical millimeter wave signals are transmitted through an MIMO wireless link to a signal (Continued)

sampling and processing unit to be converted into digital signals for digital signal processing.

17 Claims, 5 Drawing Sheets

(56) References Cited

OTHER PUBLICATIONS

Yu et al., "Faster than fiber: over 100-GB/s signal delivery in fiber wireless integration system", Optics Express vol. 21, No. 19, Sep. 2013 (Year: 2013).*

* cited by examiner

SYSTEM FOR GENERATING AND RECEIVING POLARIZATION MULTIPLEXED SINGLE SIDEBAND SIGNAL AND METHOD THEREFOR

This patent application claims the benefit and priority of Chinese Patent Application No. 2021102702102 filed in China National Intellectual Property Administration on Mar. 12, 2021 and entitled "SYSTEM FOR GENERATING AND RECEIVING POLARIZATION MULTIPLEXED SINGLE SIDEBAND SIGNAL AND METHOD THEREFOR", the disclosure of which is incorporated by reference herein in its entirety as part of the present application.

TECHNICAL FIELD

The present disclosure relates to the technical field of wireless communication systems, in particular to a system for generating and receiving a polarization multiplexed single sideband signal and a method therefor.

BACKGROUND ART

Photonics-assisted millimeter wave technology overcomes a bottleneck of bandwidth limitation of an electronic device, and can generate high-frequency millimeter wave signals with wide adjustable frequency range and low phase noise, which has been widely studied and applied in an optical fiber wireless integrated system. The optical fiber wireless integrated system fully combines advantages of large transmission capacity and a long transmission distance of an optical fiber system, advantages of mobility and seamless wide-area coverage of a wireless system, and the photonics-assisted millimeter wave technology, optical polarization multiplexing, frequency band multiplexing, wireless Multiple-Input Multiple-Output (MIMO) and other technologies, which can reduce bandwidth requirements for a receiving device and greatly improve the transmission capacity of the system. However, due to defects such as non-flat frequency response and multipath effect of the wireless system, the millimeter wave signal has low spectral efficiency in the wireless system, and there is walk-off effect caused by optical fiber dispersion.

SUMMARY

Therefore, it is necessary to provide a system for generating and receiving a polarization multiplexed single sideband signal and a method therefor, so as to solve the problems of low spectral efficiency of signals in a wireless system and walk-off effect caused by optical fiber dispersion in the conventional art.

To achieve the above effect, the present disclosure provides the following solutions.

A system for generating and receiving a polarization multiplexed single sideband signal is provided, which includes a light wave generating unit, a signal modulating unit, a driving signal generating unit, a separating and converting unit, a multi-input multi-output system (MIMO) wireless link and a signal sampling and processing unit, wherein the polarization multiplexed single sideband signal comprises a polarization multiplexed upper sideband optical signal and a polarization multiplexed lower sideband optical signal;

the light wave generating unit is connected with the signal modulating unit and is configured to generate a light wave and input the light wave into the signal modulating unit, and the driving signal generating unit is connected with the signal modulating unit and is configured to generate two driving signals to drive the signal modulating unit;

the signal modulating unit is configured to split the light wave into two orthogonal polarized light waves, modulate the driving signals on the polarized light waves based on single sideband modulation to obtain the polarization multiplexed upper sideband optical signal and the polarization multiplexed lower sideband optical signal, and couple the polarization multiplexed upper sideband optical signal and the polarization multiplexed lower sideband optical signal to output a mixed signal; the signal modulating unit is connected with the separating and converting unit through a single-mode fiber, the mixed signal is transmitted to the separating and converting unit through the single-mode fiber; the separating and converting unit is configured to separate the mixed signal and perform photoelectric conversion to obtain electrical millimeter wave signals;

the MIMO wireless link is connected with the separating and converting unit, the electrical millimeter wave signals are transmitted through the MIMO wireless link to the signal sampling and processing unit; and the signal sampling and processing unit is configured to convert the electrical millimeter wave signals into digital signals and perform digital signal processing on the digital signals.

In an embodiment, the light wave generating unit is a Distributed Feedback Bragg Laser Diode DFB-LD; the signal modulating unit is a Dual-Polarization Mach-Zehnder Modulator DP-MZM; the polarization multiplexed upper sideband optical signal is a polarization multiplexed upper sideband Quadrature Amplitude Modulation (QAM) optical signal, and the polarization multiplexed lower sideband optical signal is a polarization multiplexed lower sideband QAM optical signal;

the DP-MZM comprises a polarization beam splitter, a polarization beam combiner, a first sub-modulator and a second sub-modulator; the DFB-LD is connected with the polarization beam splitter, and is configured to generate the light wave and input the light wave into the polarization beam splitter, the polarization beam splitter is configured to split the light wave into a light wave in an X polarization direction and a light wave in a Y polarization direction which are orthogonal to each other, the light wave in the X polarization direction enters the first sub-modulator; the light wave in the Y polarization direction enters the second sub-modulator; the first sub-modulator is provided at a quadrature bias point and operates in an upper sideband modulation mode; the second sub-modulator is provided at the quadrature bias point and operates in a lower sideband modulation mode;

the driving signals comprise a first radio frequency QAM driving signal and a second radio frequency QAM driving signal; the first sub-modulator is configured to modulate the first radio frequency QAM driving signal onto the light wave in the X polarization direction to generate the polarization multiplexed upper sideband QAM optical signal, and the second sub-modulator is configured to modulate the second radio frequency QAM driving signal onto the light wave in the Y polarization direction to generate the polarization multiplexed lower sideband QAM optical signal;

the polarization multiplexed upper sideband QAM optical signal and the polarization multiplexed lower sideband QAM optical signal are coupled by the polarization beam combiner to output the mixed signal, and the mixed signal is transmitted to the separating and converting unit.

In an embodiment, the driving signal generating unit comprises a local oscillator, a frequency multiplier, a first power splitter, a second power splitter, a third power splitter, a first mixer and a second mixer;

the local oscillator, the frequency multiplier and the first power splitter are sequentially connected; the first power splitter is respectively connected with the first mixer and the second mixer;

the local oscillator is configured to generate a sinusoidal radio frequency signal, the sinusoidal radio frequency signal is output as a frequency-multipled sinusoidal radio frequency signal, through the frequency multiplier, the frequency-multipled sinusoidal radio frequency signal is split into two frequency-multipled sinusoidal radio frequency signals by the first power splitter, and the two frequency-multipled sinusoidal radio frequency signals enter the first mixer and the second mixer, respectively;

an in-phase signal and a quadrature-phase signal of a baseband-modulated first QAM signal enter the first mixer to be mixed with one of the two frequency-multipled sinusoidal radio frequency signals, thereby modulating the baseband-modulated first QAM signal onto the frequency-multipled sinusoidal radio frequency signal to generate the first radio frequency QAM driving signal; and an in-phase signal and a quadrature-phase signal of a baseband-modulated second QAM signal enter the second mixer to be mixed with another of the two frequency-multipled sinusoidal radio frequency signals, thereby modulating the baseband-modulated second QAM signal onto the frequency-multipled sinusoidal radio frequency signal to generate the second radio frequency QAM driving signal;

the first radio frequency QAM driving signal is split into two radio frequency QAM driving signals with a phase difference of 90 degrees by the second power splitter to drive the first sub-modulator; the first sub-modulator is configured to modulate the first radio frequency QAM driving signal onto the light wave in the X polarization direction to generate the polarization multiplexed upper sideband QAM optical signal;

the second radio frequency QAM driving signal is split into two second radio frequency QAM driving signals with a phase difference of 90 degrees by the third power splitter to drive the second sub-modulator; and the second sub-modulator is configured to modulate the second radio frequency QAM driving signal onto the light wave in the Y polarization direction to generate the polarization multiplexed lower sideband QAM optical signal.

In an embodiment, the separating and converting unit comprises a filter and two photodetectors; the electrical millimeter wave signals comprise a polarization multiplexed upper sideband QAM electrical signal and a polarization multiplexed lower sideband QAM electrical signal;

the filter is configured to separate the mixed signal into the polarization multiplexed upper sideband QAM optical signal in the X polarization direction and the polarization multiplexed lower sideband QAM optical signal in the Y polarization direction; the polarization multiplexed upper sideband QAM optical signal enters a first photodetector for photoelectric conversion to obtain the polarization multiplexed upper sideband QAM electrical signal; the polarization multiplexed lower sideband QAM optical signal enters a second photodetector for photoelectric conversion to obtain the polarization multiplexed lower sideband QAM electrical signal; and the polarization multiplexed upper sideband QAM electrical signal and the polarization multiplexed lower sideband QAM electrical signal enter the MIMO wireless link for transmission.

In an embodiment, the MIMO wireless link comprises a transmitting antenna and a receiving antenna;

the polarization multiplexed upper sideband QAM electrical signal and a polarization multiplexed lower sideband QPSK electrical signal are simultaneously transmitted into air by the transmitting antenna, and are simultaneously received by the receiving antenna via wireless transmission.

In an embodiment, the signal sampling and processing unit comprises an analog-to-digital converter; the analog-to-digital converter is connected with the MIMO wireless link, and the analog-to-digital converter is configured to convert the electrical millimeter wave signals into digital signals.

In an embodiment, the system further includes an erbium-doped fiber amplifier;

the mixed signal enters the erbium-doped fiber amplifier through the single-mode fiber, and the erbium-doped fiber amplifier is configured to amplify the mixed signal and input the amplified mixed signal into the filter.

In an embodiment, when the polarization multiplexed lower sideband QAM optical signal is transmitted through the single-mode fiber of 65 km and the electrical millimeter wave signal with a frequency of 28 GHz generated by the photodetector is transmitted through the MIMO wireless link of 1 m, a communication rate is 48 Gbit/s and a bit error rate of transmission is less than $4.2 \times 10^{-2}$; when the polarization multiplexed upper sideband QAM optical signal is transmitted through the single-mode fiber of 65 km and the electrical millimeter wave signal with the frequency of 28 GHz generated by the photodetector is transmitted through the MIMO wireless link of 1 m, the communication rate is 64 Gbit/s and the bit error rate of the transmission is less than $4.2 \times 10^{-2}$.

A method for generating and receiving a polarization multiplexed single sideband signal is provided, wherein the method for generating and receiving the polarization multiplexed single sideband signal is applied to the system for generating and receiving the polarization multiplexed single sideband signal described above, and the method for generating and receiving the polarization multiplexed single sideband signal includes:

by a light wave generating unit, generating a light wave and inputting the light wave into a signal modulating unit;

generating two driving signals, by a driving signal generating unit, to drive the signal modulating unit;

by a signal modulating unit, splitting the light wave into two orthogonal polarized light waves, modulating the driving signals on the polarized light waves based on single sideband modulation to obtain a polarization multiplexed upper sideband optical signal and a polarization multiplexed lower sideband optical signal, coupling the polarization multiplexed upper sideband optical signal and the polarization multiplexed lower sideband optical signal to output a mixed signal;

transmitting the mixed signal to a separating and converting unit through a single-mode fiber;

by the separating and converting unit, separating the mixed signal and performing photoelectric conversion to obtain electrical millimeter wave signals;

transmitting the electrical millimeter wave signals through a MIMO wireless link to a signal sampling and processing unit; and by the signal sampling and processing unit, converting the electrical millimeter wave signals into digital signals and performing digital signal processing on the digital signals.

In an embodiment, when a polarization multiplexed lower sideband QAM optical signal is transmitted through the single-mode fiber of 65 km and an electrical millimeter wave signal with a frequency of 28 GHz generated by a photodetector is transmitted through the MIMO wireless link of 1 m, a communication rate is 48 Gbit/s and a bit error rate of transmission is less than $4.2 \times 10^{-2}$; and when a polarization multiplexed upper sideband QAM optical signal is transmitted through the single-mode fiber of 65 km and the electrical millimeter wave signal with the frequency of 28 GHz generated by the photodetector is transmitted through the MIMO wireless link of 1 m, the communication rate is 64 Gbit/s and the bit error rate of the transmission is less than $4.2 \times 10^{-2}$.

Compared with the conventional art, the present disclosure has the following beneficial effects.

The present disclosure discloses the system for generating and receiving the polarization multiplexed single sideband signal, which generates the polarization multiplexed upper sideband optical signal and the polarization multiplexed lower sideband optical signal based on the signal modulating unit under a single sideband modulation mode. Because of high modulation efficiency of the single sideband modulation, the single sideband signal may not be attenuated due to optical fiber dispersion, thereby effectively dealing with the walk-off effect of signals in optical fiber transmission. In addition, an advanced digital signal processing technology is adopted to further improve and compensate for the signal, which may not cause signal distortion in the transmission process, avoid influence of defects such as uneven frequency response and multipath effect on transmission signals, and greatly improve spectrum efficiency of millimeter wave signals in the wireless system.

BRIEF DESCRIPTION OF THE DRAWINGS

In order to more clearly illustrate the embodiments of the present disclosure or the technical solutions in the conventional art, the accompanying drawings used in the embodiments will now be described briefly. Obviously, the drawings in the following description are only some embodiments of the present disclosure. For those skilled in the art, other drawings can be obtained according to these drawings without any creative efforts.

Figure 1:
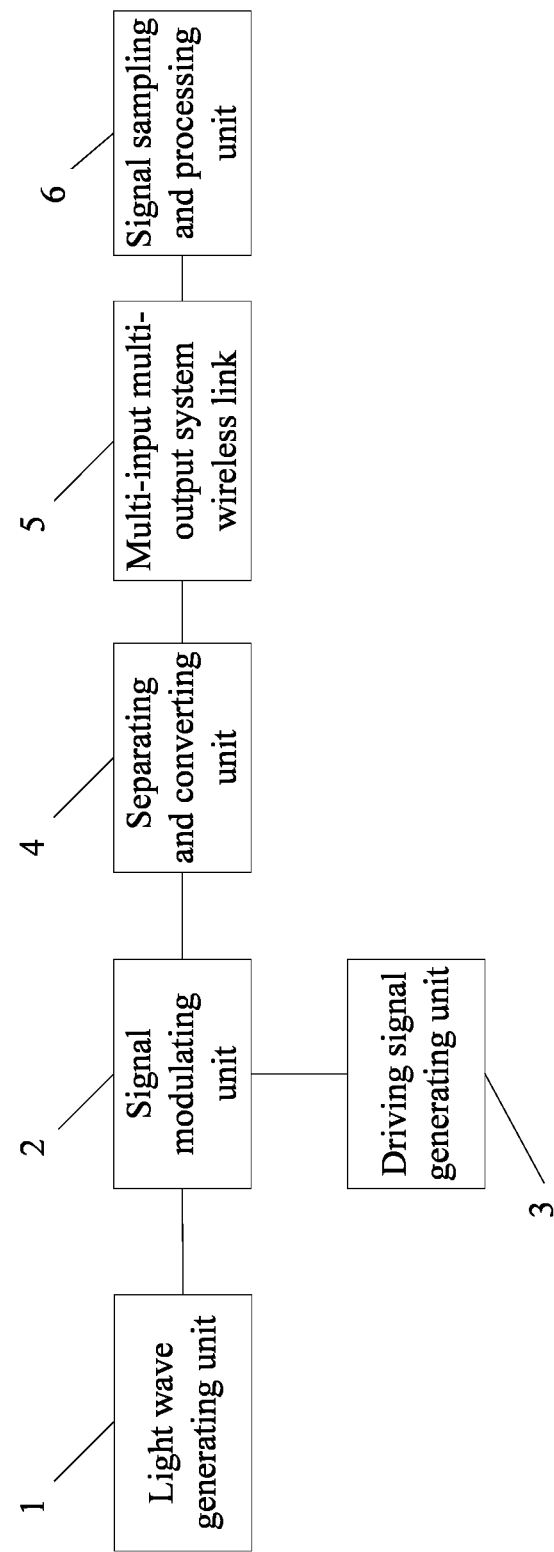
FIG. 1 is an operating flow chart of a system for generating and receiving a polarization multiplexed single sideband signal according to the present disclosure.

Description of reference numbers: Distributed Feedback Bragg Laser Diode 1, dual-polarization Mach-Zehnder modulator 2, driving signal generating unit 3, separating and converting unit 4, multi-input multi-output system wireless link 5, signal sampling and processing unit 6.

DETAILED DESCRIPTION OF THE EMBODIMENTS

The technical solutions in the embodiments of the present disclosure will be described clearly and completely with reference to the drawings in the embodiments of the present disclosure hereinafter. Obviously, the described embodiments are only a part of the embodiments of the present disclosure, rather than all of the embodiments thereof. Based on the embodiments of the present disclosure, all other embodiments obtained by those skilled in the art without any creative efforts shall fall within the scope of the present disclosure.

For a better understanding of above intention, features and advantages of the present disclosure, the present disclosure will be further described in detail with reference to the drawings and specific embodiments thereof.

As shown in FIG. 1, a system for generating and receiving a polarization multiplexed single sideband signal includes a light wave generating unit 1, a signal modulating unit 2, a driving signal generating unit 3, a separating and converting unit 4, a Multiple Input Multiple Output (MIMO) wireless link 5 and a signal sampling and processing unit 6. The polarization multiplexed single sideband signal includes a polarization multiplexed upper sideband optical signal and a polarization multiplexed lower sideband optical signal. The light wave generating unit 1 is connected with the signal modulating unit 2 and is configured to generate a light wave and input the light wave into the signal modulating unit 2.

The driving signal generating unit 3 is connected with the signal modulating unit 2 and is configured to generate two driving signals to drive the signal modulating unit 2. The signal modulating unit 2 is configured to split the light wave into two orthogonal polarized light waves, and modulate the driving signals on the polarized light waves based on single sideband modulation to obtain the polarization multiplexed upper sideband optical signal and the polarization multiplexed lower sideband optical signal, and couple the polarization multiplexed upper sideband optical signal and the polarization multiplexed lower sideband optical signal to output a mixed signal. The signal modulating unit 2 is connected with the separating and converting unit 4 through a single-mode fiber. The mixed signal is transmitted to the separating and converting unit 4 through the single-mode fiber. The separating and converting unit 4 is configured to separate the mixed signal and perform photoelectric conversion to obtain electrical millimeter wave signals. The MIMO wireless link 5 is connected with the separating and converting unit 4. The electrical millimeter wave signals are transmitted through the MIMO wireless link 5 to the signal sampling and processing unit 6. The signal sampling and processing unit 6 is configured to convert the electrical millimeter wave signals into digital signals and perform digital signal processing on the digital signals.

As an implementation of this embodiment, the light wave generating unit 1 is a Distributed Feedback Bragg Laser Diode DFB-LD. The signal modulating unit 2 is a Dual-Polarization Mach-Zehnder Modulator DP-MZM. The polarization multiplexed upper sideband optical signal is a polarization multiplexed upper sideband Quadrature Amplitude Modulation (QAM) optical signal, and the polarization multiplexed lower sideband optical signal is a polarization multiplexed lower sideband QAM optical signal.

The DP-MZM includes a polarization beam splitter, a polarization beam combiner, a first sub-modulator and a second sub-modulator. The DFB-LD is connected with the polarization beam splitter, and generates the light wave and input the light wave into the polarization beam splitter. The polarization beam splitter splits the light wave into a light wave in an X polarization direction and a light wave in a Y polarization direction which are orthogonal to each other. The light wave in the X polarization direction enters the first sub-modulator. The light wave in the Y polarization direction enters the second sub-modulator. The first sub-modulator is provided at a quadrature bias point and operates in an upper sideband modulation mode. The second sub-modulator is provided at the quadrature bias point and operates in a lower sideband modulation mode.

The driving signals include a first radio frequency QAM driving signal and a second radio frequency QAM driving signal. The first radio frequency QAM driving signal and the second radio frequency QAM driving signal can be m-order radio frequency QAM driving signals (m may represent a high-order number such as 16, 32, 64, etc.). The first sub-modulator modulates the first radio frequency QAM driving signal onto the light wave in the X polarization direction and generates the polarization multiplexed upper sideband QAM optical signal. The second sub-modulator modulates the second radio frequency QAM driving signal onto the light wave in the Y polarization direction and generates the polarization multiplexed lower sideband QAM optical signal.

The polarization multiplexed upper sideband QAM optical signal and the polarization multiplexed lower sideband QAM optical signal are coupled by the polarization beam combiner to output the mixed signal, and the mixed signal is transmitted to the separating and converting unit 4.

As an optional implementation of this embodiment, the driving signal generating unit 3 includes a local oscillator, a frequency multiplier, a first power splitter, a second power splitter, a third power splitter, a first mixer and a second mixer. The local oscillator, the frequency multiplier and the first power splitter are sequentially connected. The first power splitter is respectively connected with the first mixer and the second mixer.

The local oscillator generates a sinusoidal radio frequency signal. The sinusoidal radio frequency signal is output as a frequency-multipled sinusoidal radio frequency signal through the frequency multiplier. The frequency-multipled sinusoidal radio frequency signal is split into two frequency-multipled sinusoidal radio frequency signals by the first power splitter, and the two frequency-multipled sinusoidal radio frequency signals enter the first mixer and the second mixer, respectively.

An in-phase signal and a quadrature-phase signal of a baseband-modulated first QAM signal enter the first mixer to be mixed with one of the two frequency-multipled sinusoidal radio frequency signals, thereby modulating the baseband-modulated first QAM signal onto the frequency-multipled sinusoidal radio frequency signal to generate the first radio frequency QAM driving signal. An in-phase signal and a quadrature-phase signal of a baseband-modulated second QAM signal enter the second mixer to be mixed with another of the two frequency-multipled sinusoidal radio frequency signals, thereby modulating the baseband-modulated second QAM signal onto the frequency-multiplied sinusoidal radio frequency signal to generate the second radio frequency QAM driving signal.

The first radio frequency QAM driving signal is split into two radio frequency QAM driving signals with a phase difference of 90 degrees by the second power splitter to drive the first sub-modulator. The first sub-modulator modulates the first radio frequency QAM driving signal onto the light wave in the X polarization direction to generate the polarization multiplexed upper sideband QAM optical signal.

The second radio frequency QAM driving signal is split into two second radio frequency QAM driving signals with a phase difference of 90 degrees by the third power splitter to drive the second sub-modulator. The second sub-modulator modulates the second radio frequency QAM driving signal onto the light wave in the Y polarization direction to generate the polarization multiplexed lower sideband QAM optical signal.

As an optional implementation of this embodiment, the separating and converting unit 4 includes a filter and two photodetectors (PDs). The electrical millimeter wave signals include a polarization multiplexed upper sideband QAM electrical signal and a polarization multiplexed lower sideband QAM electrical signal.

The filter separates the mixed signal into the polarization multiplexed upper sideband QAM optical signal in the X polarization direction and the polarization multiplexed lower sideband QAM optical signal in the Y polarization direction. The polarization multiplexed upper sideband QAM optical signal enters a first photodetector for the photoelectric conversion to obtain the polarization multiplexed upper sideband QAM electrical signal. The polarization multiplexed lower sideband QAM optical signal enters a second photodetector for the photoelectric conversion to obtain the polarization multiplexed lower sideband QAM electrical signal. The polarization multiplexed upper sideband QAM electrical signal and the polarization multiplexed lower sideband QAM electrical signal enter the MIMO wireless link 5 for transmission.

As an optional implementation of this embodiment, the MIMO wireless link 5 comprises a transmitting antenna and a receiving antenna. The polarization multiplexed upper sideband QAM electrical signal and the polarization multiplexed lower sideband QPSK electrical signal are simultaneously transmitted into the air by the transmitting antenna, and are simultaneously received by the receiving antenna via wireless transmission.

As an optional implementation of this embodiment, the signal sampling and processing unit 6 includes an analog-to-digital converter. The analog-to-digital converter is connected with the MIMO wireless link 5. The analog-to-digital converter is converts the electrical millimeter wave signals into digital signals.

As an optional implementation of this embodiment, the system further includes an erbium-doped fiber amplifier.

The mixed signal enters the erbium-doped fiber amplifier through the single-mode fiber. The erbium-doped fiber amplifier is configured to amplify the mixed signal and input the amplified mixed signal into the filter.

As an implementation of this embodiment, when the polarization multiplexed lower sideband QAM optical signal is transmitted through the single-mode fiber of 65 km and the electrical millimeter wave signal with a frequency of 28 GHz generated by the photodetectors is transmitted through the MIMO wireless link 5 of 1 m, a communication rate is 48 Gbit/s and a bit error rate of transmission is less than $4.2\times10^{-2}$. When the polarization multiplexed upper sideband QAM optical signal is transmitted through the single-mode fiber of 65 km and the electrical millimeter wave signal with the frequency of 28 GHz generated by the photodetectors is transmitted through the MIMO wireless link 5 of 1 m, the communication rate is 64 Gbit/s and the bit error rate of the transmission is less than $4.2\times10^{-2}$.

A method for generating and receiving a polarization multiplexed single sideband signal is provided, wherein the method for generating and receiving the polarization multiplexed single sideband signal is applied to the system for generating and receiving the polarization multiplexed single sideband signal described above. The method for generating and receiving the polarization multiplexed single sideband signal includes: by the light wave generating unit 1, generating the light wave and input the light wave into the signal modulating unit 2; by the driving signal generating unit 3, generating two driving signals, to drive the signal modulating unit 2; by the signal modulating unit 2, splitting the light wave into two orthogonal polarized light waves, modulating the driving signals on the polarized light waves based on the single sideband modulation to obtain the polarization multiplexed upper sideband optical signal and the polarization multiplexed lower sideband optical signal, coupling the polarization multiplexed upper sideband optical signal and the polarization multiplexed lower sideband optical signal to output a mixed signal, and transmitting the mixed signal to the separating and converting unit 4 through the single-mode fiber;

by the separating and converting unit 4, separating the mixed signal and performing the photoelectric conversion to obtain the electrical millimeter wave signals; transmitting the electrical millimeter wave signals through the MIMO wireless link 5 to the signal sampling and processing unit 6; and by the signal sampling and processing unit 6, converting the electrical millimeter wave signals into digital signals and performing digital signal processing on the digital signals.

As an implementation of this embodiment, when the polarization multiplexed lower sideband QAM optical signal is transmitted through the single-mode fiber of 65 km and the electrical millimeter wave signal with a frequency of 28 GHz generated by the photodetector is transmitted through the MIMO wireless link 5 of 1 m, the communication rate is 48 Gbit/s and the bit error rate of the transmission is less than $4.2 \times 10^{-2}$; when the polarization multiplexed upper sideband QAM optical signal is transmitted through the single-mode fiber of 65 km and the electrical millimeter wave signal with the frequency of 28 GHz generated by the photodetector is transmitted through the MIMO wireless link 5 of 1 m, the communication rate is 64 Gbit/s and the bit error rate of the transmission is less than $4.2 \times 10^{-2}$.

Figure 2:
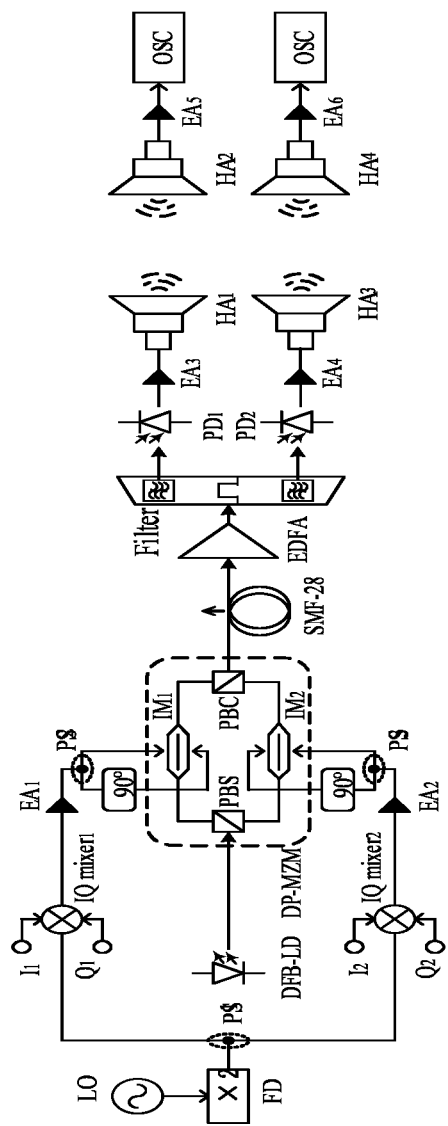
FIG. 2 is an experimental schematic diagram of generating a polarization multiplexed upper sideband 16 QAM signal and a polarization multiplexed lower sideband QPSK signal by using a single DP-MZM according to the present disclosure.

As shown in FIG. 2, by combining the above technical solutions of the present disclosure with practical applications, an experimental solution for generating an upper sideband 16 QAM signal and a lower sideband QPSK signal (the QPSK signal also belongs to QAM signal, and the QPSK signal in the present disclosure essentially belongs to 4 QAM signal) is as follows.

Step 1: A Distributed Feedback Bragg Laser Diode (DFB-LD) generates a continuous light wave with a wavelength of 1552.3 nm. The continuous light wave is modulated by the DP-MZM (Fujitsu DP-BPSK 40 Gbs MZ GPPO Dual Drive LiNbO3 Modulator, FTM7981EDA) modulator with a 3 dB bandwidth of 30 GHz and an insertion loss of 6 dB. The DP-MZM modulator is packaged with the polarization beam splitter PBS, the polarization beam combiner PBC, the first sub-modulator IM1 and the second sub-modulator IM2. The polarization beam splitter PBS splits the continuous light wave into the light wave in the X polarization direction and the light wave in the Y polarization direction which are orthogonal to each other, and the light wave in the X polarization direction and the light wave in the Y polarization direction enter the first sub-modulator $IM_1$ and the second sub-modulator $IM_2$, respectively. The first sub-modulator $IM_1$ is driven by a 6 Gbaud radio frequency 16 QAM driving signal, and the second sub-modulator $IM_2$ is driven by a 12 Gbaud radio frequency QPSK driving signal.

Step 2: A 14 GHz sine wave is generated by the local oscillator LO and output as a sine wave of 28 GHz through the frequency multiplier FD (×2). The sine wave of 28 GHz is split into two light waves by the first power splitter $PS_1$ and the two light waves enter the first mixer IQ mixer1 and the second mixer IQ mixer2, respectively. The radio frequency QPSK driving signal is generated by mixing two in-phase ($I_2$) and orthogonal ($Q_2$) binary data with the sine wave of 28 GHz through the second mixer IQ mixer2, and the radio frequency 16 QAM driving signal is generated by mixing two in-phase ($I_1$) and orthogonal ($Q_1$) fourth-order pulse amplitude modulation (PAM4) signals with the sine wave of 28 GHz respectively through the first mixer IQ mixer1. Lengths of the signals are all $2^{-10}$-1, and driving amplitude is 1 Vpp.

Step 3: The radio frequency 16 QAM driving signal is amplified by an electric amplifier $EA_1$ with a gain of 20 dB and operating at DC~40 GHz, and then is modulated by the first sub-modulator $IM_1$. The 12 Gbaud radio frequency QPSK driving signal is amplified by an electric amplifier $EA_2$ with a gain of 20 dB and operating at DC~40 GHz, and then is modulated by the second sub-modulator $IM_2$. The radio frequency 16 QAM driving signal is split into two radio frequency 16 QAM driving signals with a phase difference of 90 degrees by the second power splitter $PS_2$ to drive the first sub-modulator $IM_1$. The radio frequency QPSK driving signal is split into two radio frequency QPSK driving signals with a phase difference of 90 degrees by the third power splitter $PS_3$ to drive the second sub-modulator $IM_2$. The first sub-modulator $IM_1$ is provided at the quadrature bias point and operates in the upper sideband modulation mode. The second sub-modulator $IM_2$ is provided at the quadrature bias point and operates in the lower sideband mode. The first sub-modulator $IM_1$ modulates the radio frequency 16 QAM driving signal onto the light wave in the X polarization direction, and outputs the polarization multiplexed upper sideband 16 QAM optical signal. The second sub-modulator $IM_2$ modulates the radio frequency QPSK driving signal onto the light wave in the Y polarization direction, and outputs the polarization multiplexed lower sideband QPSK optical signal. The polarization multiplexed upper sideband 16 QAM optical signal and the polarization multiplexed lower sideband QPSK optical signal are coupled by the polarization beam combiner PBC to output the mixed signal. Then the mixed signal is transmitted through an SMF-28 single-mode fiber and amplified by an Erbium Doped Fiber Amplifier (EDFA). The amplified mixed signal is transmitted to a filter with a space of 50/100 GHz to separate the polarization multiplexed single sideband optical signals in the X and Y polarization directions respectively. And the separated polarization multiplexed single sideband optical signals in the X and Y polarization directions enter two photodetectors with a bandwidth of 75 GHz respectively. The polarization multiplexed upper sideband 16 QAM optical signal in the X polarization direction enters the first photodetector $PD_1$ to complete the photoelectric conversion to obtain a polarization multiplexed upper sideband 16 QAM electrical signal. The polarization multiplexed lower sideband QPSK optical signal in the Y polarization direction enters the second photodetector $PD_2$ to complete the photoelectric conversion to obtain the polarization multiplexed lower sideband QPSK electrical signal. Two electrical vector signals are amplified by the electric amplifiers $EA_3$ and $EA_4$ with a gain of 30 dB and operating at DC-50 GHz respectively, and finally sent to a subsequent 2×2 MIMO wireless link for transmission.

Step 4: The 2×2 MIMO wireless link consists of two pairs of horn antennas ($HA_1$ and $HA_2$, $HA_3$ and $HA_4$) with the same polarization state (horizontal polarization or vertical polarization). The horn antenna has a frequency range of 26.5 GHz~40 GHz, a gain of 25 dB, and good directivity. Two wireless links are provided in a parallel structure. Two amplified electrical millimeter wave signals in the X and Y polarization directions are simultaneously transmitted into the air by the transmitting antennas $HA_1$ and $HA_3$, and are simultaneously received by the receiving antennas $HA_2$ and $HA_4$ after wireless transmission of 1 m respectively. Then the two electrical signals are amplified by electric amplifiers $EA_5$ and $EA_6$ with a gain of 30 dB and operating at DC~60 GHz, respectively, and then the amplified electrical signals are captured by Oscilloscopes (OSCs) with a 3 dB bandwidth of 62 GHz and a sampling rate of 160 GSa/s to obtain discrete digital signals.

Step 5: Off-line digital signal processing (DSP) is performed on the discrete digital signals captured by the oscilloscopes, and includes main steps of: down-conversion, digital low-pass filtering, resampling, polarization demultiplexing constant modulus algorithm, frequency offset estimation, phase retrieval, decision-guided least mean square error algorithm and bit error rate calculation.

According to the present disclosure, a solution for generating a polarization multiplexed SSB QAM signal and a SSB QPSK signal based on a single DP-MZM is proposed. Experiments show a Radio Over Fiber (ROF) system based on the single DP-MZM, and the wireless transmission thereof adopts the 2×2 MIMO wireless link, which can double the system capacity. Experiments show that when a PDM-QPSK optical signal and a PDM-16 QAM optical signal are transmitted through the single-mode fiber of 65 km and the electrical millimeter wave signals with the frequency of 28 GHz generated by the photodetectors are transmitted through the MIMO wireless link of 1 m, the communication rate is 48 Gbit/s and the maximum bit error rate is less than $4.2 \times 10^{-2}$. In addition, it is further verified that when the PDM-16 QAM optical signal is transmitted through the single-mode fiber of 65 km and the electrical millimeter wave signal with the frequency of 28 GHz generated by the photodetector is transmitted through the MIMO wireless link of 1 m, the communication rate is 32 Gbit/s-64 Gbit/s and the bit error rate at the maximum transmission rate is also less than $4.2 \times 10^{-2}$.

Figure 3:
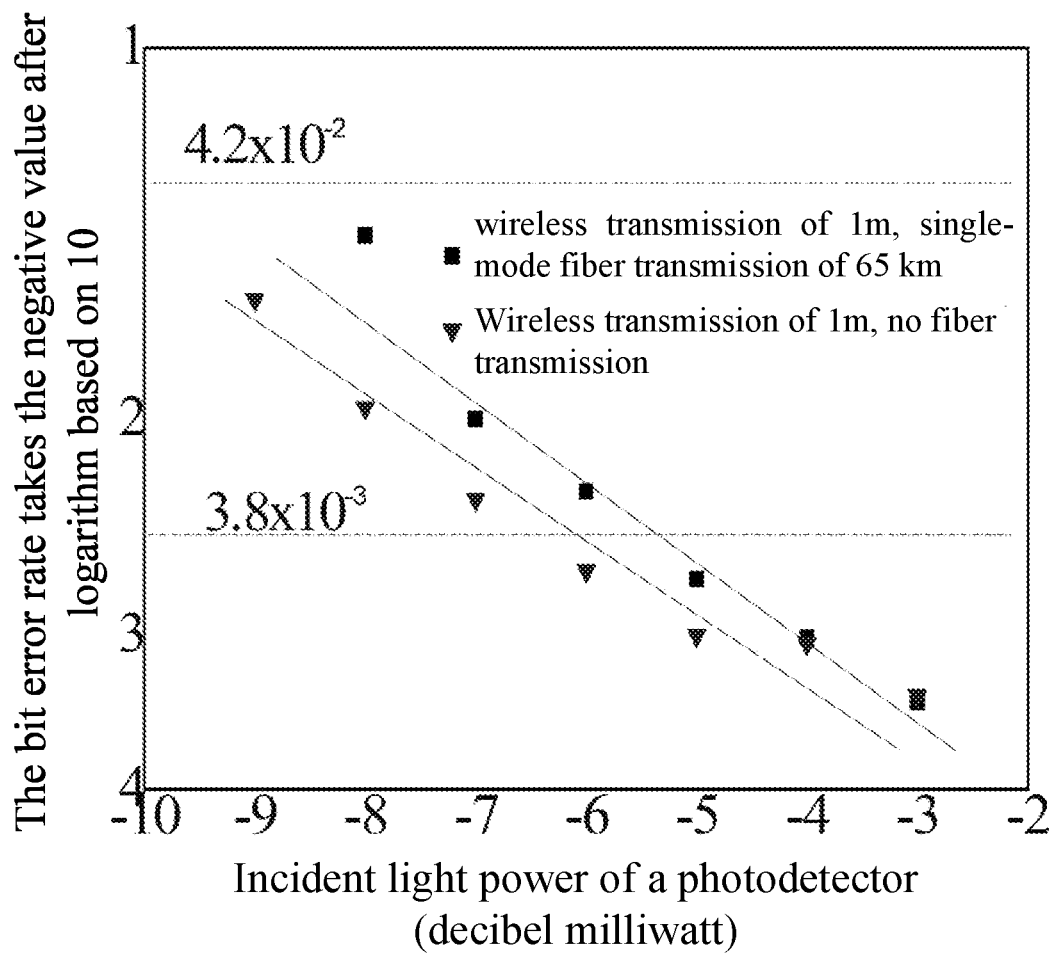
FIG. 3 is a graph showing a variation of a bit error rate of the QPSK signal with input power of a photodetector according to the present disclosure.

As shown in FIG. 3, FIG. 3 shows graphs of arithmetic mean of bit error rates (BERs) of a QPSK signal with baud rate of 12 Gbaud solved in the X and Y polarization directions against the input optical power under two different cases. The first case indicates the graph of arithmetic mean of the BER solved after a PDM-QPSK signal is transmitted through the wireless link of 1 m and the single-mode fiber of 65 km against the input optical power. The second case indicates the graph of arithmetic mean of the BER in the X and Y polarization directions solved after the PDM-QPSK signal is transmitted only through the wireless link of 1 m against the input optical power. The communication rate of the 12 Gbaud QPSK signal in the polarization multiplexed ROF system of this solution is 48 GBit/s. When the PDM-QPSK optical signal is transmitted in the single-mode fiber of 65 km, the electrical millimeter wave signal with the frequency of 28 GHz generated by the photodetector is transmitted in the MIMO wireless link of 1 m, and the optical power input to the PD is −8 dBm, the BER is still less than $4.2 \times 10^{-2}$.

Figure 4:
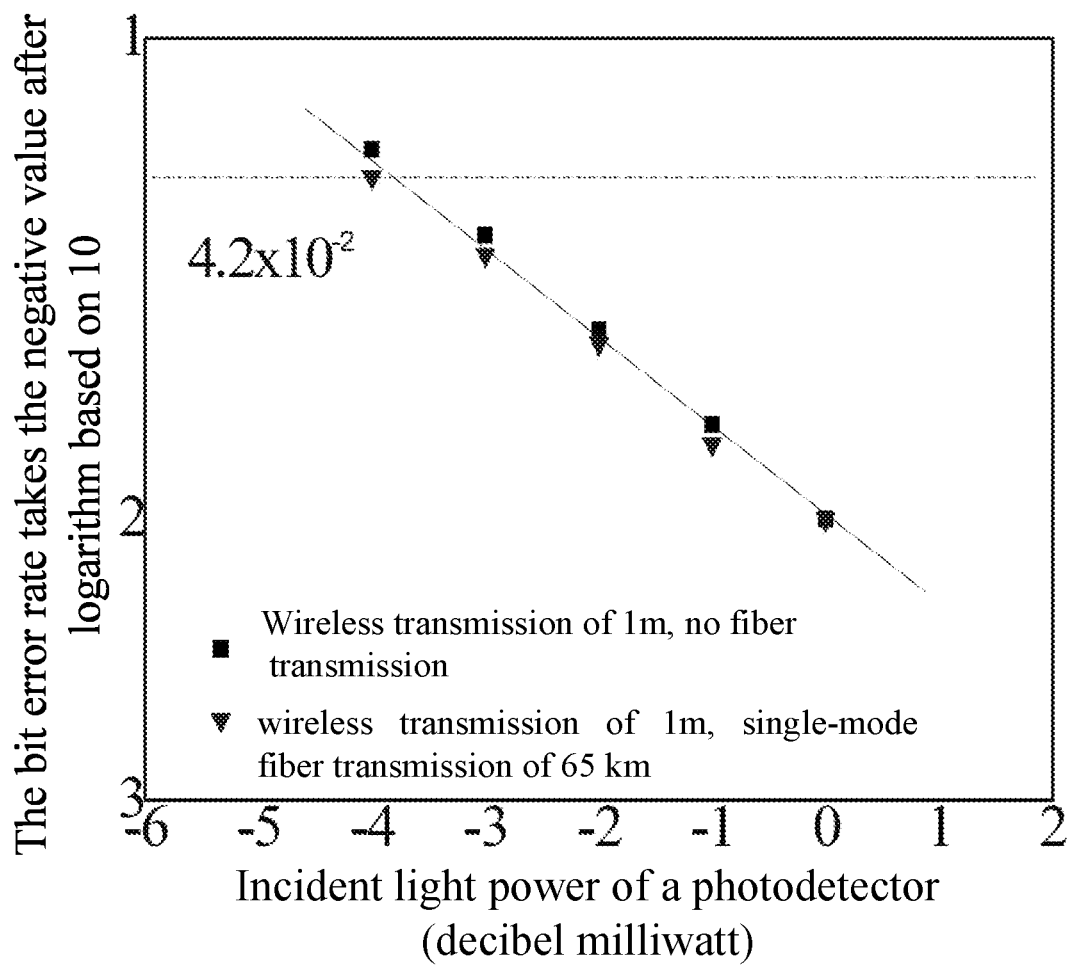
FIG. 4 is a graph showing a variation of a bit error rate of the 16 QAM signal with the input power of the photodetector according to the present disclosure.

As shown in FIG. 4, FIG. 4 shows graphs of the arithmetic mean value of the BERs of a 16 QAM signal with the baud rate of 6 Gbaud solved in the X and Y polarization directions against the input optical power under two different cases. The first case indicates the graph of the BER solved after the 16 QAM signal is transmitted only through the wireless link of 1 m against the input optical power. The second case indicates the graph of the BER solved after the 16 QAM signal is transmitted through the single-mode fiber of 65 km and the wireless link of 1 m against the input optical power. The communication rate of the 6 Gbaud 16 QAM signal in the polarization multiplexed ROF system in the present disclosure is 48 Gbit/s. It can be seen from the changes of the two curves in FIG. 4 that the bit error rate solved after being transmitted through the single-mode fiber of 65 km and the wireless link of 1 m is better than the bit error rate after being transmitted only through the wireless link of 1 m, because the signal waveform is affected by optical fiber transmission, which leads to a reduction in the bit error rate of the signal, but the reduction of the bit error rate is temporary and slight.

Figure 5:
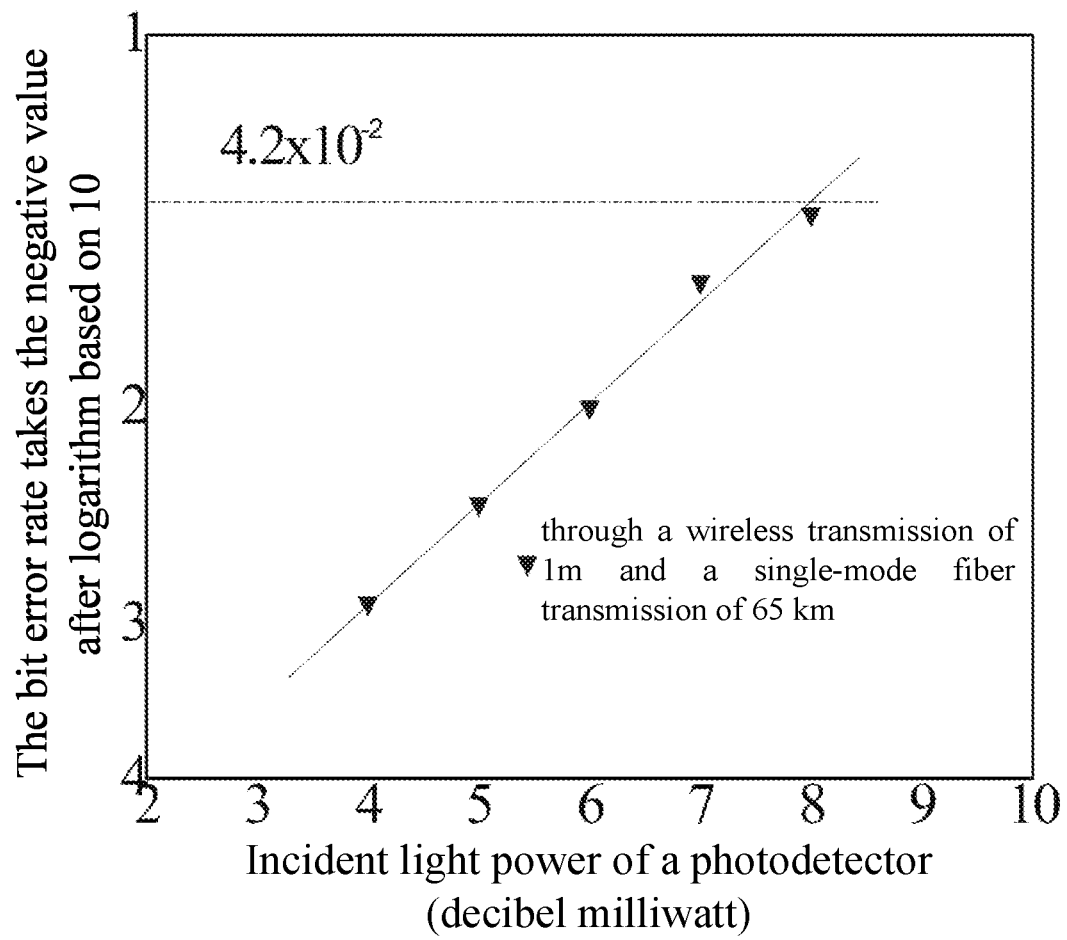
FIG. 5 is a graph showing the variation of the bit error rate of the 16 QAM signal with a baud rate according to the present disclosure.

As shown in FIG. 5, FIG. 5 shows the graph of the BER of the 16 QAM signal against the input baud rate when the optical power input to the PD is 0 dBm. At a transmitting end, by providing different baud rates of PAM4 signals, the BERs of received 16 QAM signals with different rates processed by off-line DSP are obtained, where the baud rate varies from 3 Gbaud to 8 Gbaud. When the baud rate given in the experiment is large, optical signal-to-noise ratio of the system and bandwidth of optical devices such as DP-MZM, EDFA and EA have higher requirements. Due to bandwidth limitations of some optical devices used in the experiment, the BER deteriorates gradually with the increase of the signal baud rate. Even so, when the baud rate is 8 Gbaud, the communication rate is 64 Gbit/s, the 16 QAM optical signal is transmitted through the single-mode fiber of 65 km and the electrical millimeter wave signal with a frequency of 28 GHz generated by the photodetector is transmitted through the MIMO wireless link of 1 m, the maximum BER is less than $4.2 \times 10^{-2}$.

The ROF transmission system according to the present disclosure, for generating the polarization multiplexed SSB QAM signal and the polarization multiplexed SSB QPSK signal based on the single DP-MZM, has a simple structure. The system adopts a polarization multiplexing method to double the transmission rate of the system, and adopts an advanced modulation format and digital signal processing (DSP) technology to further improve and compensate the signals, which improves performance of an optical fiber wireless integrated system and frequency spectrum efficiency of the signals. Meanwhile, the SSB modulation has high modulation efficiency and is insensitive to the optical fiber dispersion, which can effectively deal with walk-off effect of signals in the optical fiber transmission and has a great application value in future optical fiber wireless integrated systems.

Various embodiments of the description have been described in a progressive manner, and each of which focuses on the differences from the others and among which the same and similar parts can be referred to each other. Because the system disclosed in the embodiment corresponds to the method disclosed in the embodiment, it is described relatively simply, and the relevant parts can be found in the description of the method.

In the present disclosure, the principles and implementations of the present disclosure have been described within specific examples, and the explanation of the above embodiments is only used to help understand the method and its core idea of the present disclosure. Meanwhile, according to the teachings of the present disclosure, there will be some changes in the specific implementation and application scope for those skilled in the art. In conclusion, the contents of this specification should not be construed as limiting the present disclosure.

What is claimed is:

1. A system for generating and receiving a polarization multiplexed single sideband signal, which comprises a light wave generating unit, a signal modulating unit, a driving signal generating unit, a separating and converting unit, a multi-input multi-output system (MIMO) wireless link and a signal sampling and processing unit, wherein the polarization multiplexed single sideband signal comprises a polarization multiplexed upper sideband optical signal and a polarization multiplexed lower sideband optical signal;

the light wave generating unit is connected with the signal modulating unit and is configured to generate a light wave and input the light wave into the signal modulating unit, and the driving signal generating unit is connected with the signal modulating unit and is configured to generate two driving signals to drive the signal modulating unit;

the signal modulating unit is configured to split the light wave into two orthogonal polarized light waves, modulate the driving signals on the orthogonal polarized light waves based on single sideband modulation to obtain the polarization multiplexed upper sideband optical signal and the polarization multiplexed lower sideband optical signal, and couple the polarization multiplexed upper sideband optical signal and the polarization multiplexed lower sideband optical signal to output a mixed signal; the signal modulating unit is connected with the separating and converting unit through a single-mode fiber, the mixed signal is transmitted to the separating and converting unit through the single-mode fiber; the separating and converting unit is configured to separate the mixed signal and perform photoelectric conversion to obtain electrical millimeter wave signals;

the MIMO wireless link is connected with the separating and converting unit, the electrical millimeter wave signals are transmitted through the MIMO wireless link to the signal sampling and processing unit; and the signal sampling and processing unit is configured to convert the electrical millimeter wave signals into digital signals and perform digital signal processing on the digital signals, wherein the light wave generating unit is a Distributed Feedback Bragg Laser Diode (DFB-LD); the signal modulating unit is a Dual-Polarization Mach-Zehnder Modulator (DP-MZM); the polarization multiplexed upper sideband optical signal is a polarization multiplexed upper sideband Quadrature Amplitude Modulation (QAM) optical signal, and the polarization multiplexed lower sideband optical signal is a polarization multiplexed lower sideband QAM optical signal;

the DP-MZM comprises a polarization beam splitter, a polarization beam combiner, a first sub-modulator and a second sub-modulator; the DFB-LD is connected with the polarization beam splitter, and is configured to generate the light wave and input the light wave into the polarization beam splitter, the polarization beam splitter is configured to split the light wave into a light wave in an X polarization direction and a light wave in a Y polarization direction which are orthogonal to each other, the light wave in the X polarization direction enters the first sub-modulator; the light wave in the Y polarization direction enters the second sub-modulator; the first sub-modulator is provided at a quadrature bias point and operates in an upper sideband modulation mode; the second sub-modulator is provided at the quadrature bias point and operates in a lower sideband modulation mode;

the driving signals comprise a first radio frequency QAM driving signal and a second radio frequency QAM driving signal; the first sub-modulator is configured to modulate the first radio frequency QAM driving signal onto the light wave in the X polarization direction to generate the polarization multiplexed upper sideband QAM optical signal, and the second sub-modulator is configured to modulate the second radio frequency QAM driving signal onto the light wave in the Y polarization direction to generate the polarization multiplexed lower sideband QAM optical signal;

the polarization multiplexed upper sideband QAM optical signal and the polarization multiplexed lower sideband QAM optical signal are coupled by the polarization beam combiner to output the mixed signal, and the mixed signal is transmitted to the separating and converting unit.

2. The system for generating and receiving the polarization multiplexed single sideband signal according to claim 1, wherein the driving signal generating unit comprises a local oscillator, a frequency multiplier, a first power splitter, a second power splitter, a third power splitter, a first mixer and a second mixer;

the local oscillator, the frequency multiplier and the first power splitter are sequentially connected; the first power splitter is respectively connected with the first mixer and the second mixer;

the local oscillator is configured to generate a sinusoidal radio frequency signal, the sinusoidal radio frequency signal is output as a frequency-multiplied sinusoidal radio frequency signal, through the frequency multiplier, the frequency-multiplied sinusoidal radio frequency signal is split into two frequency-multiplied sinusoidal radio frequency signals by the first power splitter, and the two frequency-multiplied sinusoidal radio frequency signals enter the first mixer and the second mixer, respectively;

an in-phase signal and a quadrature-phase signal of a baseband-modulated first QAM signal enter the first mixer to be mixed with one of the two frequency-multiplied sinusoidal radio frequency signals, thereby modulating the baseband-modulated first QAM signal onto the frequency-multiplied sinusoidal radio frequency signal to generate the first radio frequency QAM driving signal; and an in-phase signal and a quadrature-phase signal of a baseband-modulated second QAM signal enter the second mixer to be mixed with another of the two frequency-multiplied sinusoidal radio frequency signals, thereby modulating the baseband-modulated second QAM signal onto the frequency-multiplied sinusoidal radio frequency signal to generate the second radio frequency QAM driving signal;

the first radio frequency QAM driving signal is split into two radio frequency QAM driving signals with a phase difference of 90 degrees by the second power splitter to drive the first sub-modulator; the first sub-modulator is configured to modulate the first radio frequency QAM driving signal onto the light wave in the X polarization direction to generate the polarization multiplexed upper sideband QAM optical signal;

the second radio frequency QAM driving signal is split into two second radio frequency QAM driving signals with a phase difference of 90 degrees by the third power splitter to drive the second sub-modulator; and the second sub-modulator is configured to modulate the second radio frequency QAM driving signal onto the light wave in the Y polarization direction to generate the polarization multiplexed lower sideband QAM optical signal.

3. The system for generating and receiving the polarization multiplexed single sideband signal according to claim 2, wherein the separating and converting unit comprises a filter and two photodetectors; the electrical millimeter wave signals comprise a polarization multiplexed upper sideband QAM electrical signal and a polarization multiplexed lower sideband QAM electrical signal;

the filter is configured to separate the mixed signal into the polarization multiplexed upper sideband QAM optical signal in the X polarization direction and the polarization multiplexed lower sideband QAM optical signal in the Y polarization direction; the polarization multiplexed upper sideband QAM optical signal enters a first photodetector for photoelectric conversion to obtain the polarization multiplexed upper sideband QAM electrical signal; the polarization multiplexed lower sideband QAM optical signal enters a second photodetector for photoelectric conversion to obtain the polarization multiplexed lower sideband QAM electrical signal; and the polarization multiplexed upper sideband QAM electrical signal and the polarization multiplexed lower sideband QAM electrical signal enter the MIMO wireless link for transmission.

4. The system for generating and receiving the polarization multiplexed single sideband signal according to claim 3, wherein the MIMO wireless link comprises a transmitting antenna and a receiving antenna;

the polarization multiplexed upper sideband QAM electrical signal and a polarization multiplexed lower sideband QPSK electrical signal are simultaneously transmitted into air by the transmitting antenna, and are simultaneously received by the receiving antenna via wireless transmission.

5. The system for generating and receiving the polarization multiplexed single sideband signal according to claim 4, wherein the signal sampling and processing unit comprises an analog-to-digital converter; the analog-to-digital converter is connected with the MIMO wireless link, and the analog-to-digital converter is configured to convert the electrical millimeter wave signals into digital signals.

6. The system for generating and receiving the polarization multiplexed single sideband signal according to claim 5, further comprising an erbium-doped fiber amplifier;

the mixed signal enters the erbium-doped fiber amplifier through the single-mode fiber, and the erbium-doped fiber amplifier is configured to amplify the mixed signal and input the amplified mixed signal into the filter.

7. The system for generating and receiving the polarization multiplexed single sideband signal according to claim 6, wherein when the polarization multiplexed lower sideband QAM optical signal is transmitted through the single-mode fiber of 65 km and the electrical millimeter wave signal with a frequency of 28 GHz generated by the photodetector is transmitted through the MIMO wireless link of 1 m, a communication rate is 48 Gbit/s and a bit error rate of transmission is less than $4.2 \times 10^{-2}$;

when the polarization multiplexed upper sideband QAM optical signal is transmitted through the single-mode fiber of 65 km and the electrical millimeter wave signal with the frequency of 28 GHz generated by the photodetector is transmitted through the MIMO wireless link of 1 m, the communication rate is 64 Gbit/s and the bit error rate of the transmission is less than $4.2 \times 10^{-2}$.

8. A method for generating and receiving a polarization multiplexed single sideband signal, wherein the method for generating and receiving the polarization multiplexed single sideband signal is applied to the system for generating and receiving the polarization multiplexed single sideband signal according to claim 1, and the method for generating and receiving the polarization multiplexed single sideband signal comprises:

by a light wave generating unit, generating a light wave and inputting the light wave into a signal modulating unit;

generating two driving signals, by a driving signal generating unit, to drive the signal modulating unit;

by a signal modulating unit, splitting the light wave into two orthogonal polarized light waves, modulating the driving signals on the orthogonal polarized light waves based on single sideband modulation to obtain a polarization multiplexed upper sideband optical signal and a polarization multiplexed lower sideband optical signal, coupling the polarization multiplexed upper sideband optical signal and the polarization multiplexed lower sideband optical signal to output a mixed signal, and transmitting the mixed signal to a separating and converting unit through a single-mode fiber; and by the separating and converting unit, separating the mixed signal and performing photoelectric conversion to obtain electrical millimeter wave signals;

transmitting the electrical millimeter wave signals through a MIMO wireless link to a signal sampling and processing unit; and by the signal sampling and processing unit, converting the electrical millimeter wave signals into digital signals and performing digital signal processing on the digital signals.

9. The method for generating and receiving the polarization multiplexed single sideband signal according to claim 8, wherein when a polarization multiplexed lower sideband QAM optical signal is transmitted through the single-mode fiber of 65 km and an electrical millimeter wave signal with a frequency of 28 GHz generated by a photodetector is transmitted through the MIMO wireless link of 1 m, a communication rate is 48 Gbit/s and a bit error rate of transmission is less than $4.2 \times 10^{-2}$; and when a polarization multiplexed upper sideband QAM optical signal is transmitted through the single-mode fiber of 65 km and the electrical millimeter wave signal with the frequency of 28 GHz generated by the photodetector is transmitted through the MIMO wireless link of 1 m, the communication rate is 64 Gbit/s and the bit error rate of the transmission is less than $4.2 \times 10^{-2}$.

10. The method for generating and receiving the polarization multiplexed single sideband signal according to claim 8, wherein the driving signal generating unit comprises a local oscillator, a frequency multiplier, a first power splitter, a second power splitter, a third power splitter, a first mixer and a second mixer;

the local oscillator, the frequency multiplier and the first power splitter are sequentially connected; the first power splitter is respectively connected with the first mixer and the second mixer;

the local oscillator generates a sinusoidal radio frequency signal, the sinusoidal radio frequency signal is output as a frequency-multiplied sinusoidal radio frequency signal, through the frequency multiplier, the frequency-multiplied sinusoidal radio frequency signal is split into two frequency-multiplied sinusoidal radio frequency signals by the first power splitter, and the two frequency-multiplied sinusoidal radio frequency signals enter the first mixer and the second mixer, respectively;

an in-phase signal and a quadrature-phase signal of a baseband-modulated first QAM signal enter the first mixer to be mixed with one of the two frequency-multiplied sinusoidal radio frequency signals, thereby modulating the baseband-modulated first QAM signal onto the frequency-multiplied sinusoidal radio frequency signal to generate the first radio frequency QAM driving signal; and an in-phase signal and a quadrature-phase signal of a baseband-modulated second QAM signal enter the second mixer to be mixed with another of the two frequency-multiplied sinusoidal radio frequency signals, thereby modulating the baseband-modulated second QAM signal onto the frequency-multiplied sinusoidal radio frequency signal to generate the second radio frequency QAM driving signal;

the first radio frequency QAM driving signal is split into two radio frequency QAM driving signals with a phase difference of 90 degrees by the second power splitter to drive the first sub-modulator; the first sub-modulator modulates the first radio frequency QAM driving signal onto the light wave in the X polarization direction to generate the polarization multiplexed upper sideband QAM optical signal;

the second radio frequency QAM driving signal is split into two second radio frequency QAM driving signals with a phase difference of 90 degrees by the third power splitter to drive the second sub-modulator; and the second sub-modulator modulates the second radio frequency QAM driving signal onto the light wave in the Y polarization direction to generate the polarization multiplexed lower sideband QAM optical signal.

11. The method for generating and receiving the polarization multiplexed single sideband signal according to claim 10, wherein when a polarization multiplexed lower sideband QAM optical signal is transmitted through the single-mode fiber of 65 km and an electrical millimeter wave signal with a frequency of 28 GHz generated by a photodetector is transmitted through the MIMO wireless link of 1 m, a communication rate is 48 Gbit/s and a bit error rate of transmission is less than $4.2 \times 10^{-2}$; and when a polarization multiplexed upper sideband QAM optical signal is transmitted through the single-mode fiber of 65 km and the electrical millimeter wave signal with the frequency of 28 GHz generated by the photodetector is transmitted through the MIMO wireless link of 1 m, the communication rate is 64 Gbit/s and the bit error rate of the transmission is less than $4.2 \times 10^{-2}$.

12. The method for generating and receiving the polarization multiplexed single sideband signal according to claim 10, wherein the separating and converting unit comprises a filter and two photodetectors; the electrical millimeter wave signals comprise a polarization multiplexed upper sideband QAM electrical signal and a polarization multiplexed lower sideband QAM electrical signal;

the filter separates the mixed signal into the polarization multiplexed upper sideband QAM optical signal in the X polarization direction and the polarization multiplexed lower sideband QAM optical signal in the Y polarization direction; the polarization multiplexed upper sideband QAM optical signal enters a first photodetector for photoelectric conversion to obtain the polarization multiplexed upper sideband QAM electrical signal; the polarization multiplexed lower sideband QAM optical signal enters a second photodetector for photoelectric conversion to obtain the polarization multiplexed lower sideband QAM electrical signal; and the polarization multiplexed upper sideband QAM electrical signal and the polarization multiplexed lower sideband QAM electrical signal enter the MIMO wireless link for transmission.

13. The method for generating and receiving the polarization multiplexed single sideband signal according to claim 12, wherein when a polarization multiplexed lower sideband QAM optical signal is transmitted through the single-mode fiber of 65 km and an electrical millimeter wave signal with a frequency of 28 GHz generated by a photodetector is transmitted through the MIMO wireless link of 1 m, a communication rate is 48 Gbit/s and a bit error rate of transmission is less than $4.2 \times 10^{-2}$; and when a polarization multiplexed upper sideband QAM optical signal is transmitted through the single-mode fiber of 65 km and the electrical millimeter wave signal with the frequency of 28 GHz generated by the photodetector is transmitted through the MIMO wireless link of 1 m, the communication rate is 64 Gbit/s and the bit error rate of the transmission is less than $4.2 \times 10^{-2}$.

14. The method for generating and receiving the polarization multiplexed single sideband signal according to claim 12, wherein the MIMO wireless link comprises a transmitting antenna and a receiving antenna;

the polarization multiplexed upper sideband QAM electrical signal and a polarization multiplexed lower sideband QPSK electrical signal are simultaneously transmitted into air by the transmitting antenna, and are simultaneously received by the receiving antenna via wireless transmission.

15. The method for generating and receiving the polarization multiplexed single sideband signal according to claim 14, wherein when a polarization multiplexed lower sideband QAM optical signal is transmitted through the single-mode fiber of 65 km and an electrical millimeter wave signal with a frequency of 28 GHz generated by a photodetector is transmitted through the MIMO wireless link of 1 m, a communication rate is 48 Gbit/s and a bit error rate of transmission is less than $4.2 \times 10^{-2}$; and when a polarization multiplexed upper sideband QAM optical signal is transmitted through the single-mode fiber of 65 km and the electrical millimeter wave signal with the frequency of 28 GHz generated by the photodetector is transmitted through the MIMO wireless link of 1 m, the communication rate is 64 Gbit/s and the bit error rate of the transmission is less than $4.2 \times 10^{-2}$.

16. The method for generating and receiving the polarization multiplexed single sideband signal according to claim 14, wherein the signal sampling and processing unit comprises an analog-to-digital converter, which is connected with the MIMO wireless link, and converts the electrical millimeter wave signals into digital signals.

17. The method for generating and receiving the polarization multiplexed single sideband signal according to claim 16, the mixed signal enters an erbium-doped fiber amplifier through the single-mode fiber to amplify the mixed signal and input the amplified mixed signal into the filter.

* * * * *